United States Patent [19]

Mazgarov et al.

[11] Patent Number: 5,683,574
[45] Date of Patent: Nov. 4, 1997

[54] METHOD FOR THE EXTRACTION OF LOW MOLECULAR WEIGHT MERCAPTANS FROM PETROLEUM AND GAS CONDENSATES

[75] Inventors: Akhmet Mazgarovich Mazgarov; Azat Faridovich Vildanov; Nailya Gilmutdinovna Bazhirova; Gulnara Burkhanova Niamutdinova; Sergei Nikolaevich Sukhov, all of Kazan, Russian Federation

[73] Assignee: Chevron U.S.A. Inc., San Francisco, Calif.

[21] Appl. No.: 509,402

[22] Filed: Jul. 31, 1995

[30] Foreign Application Priority Data

Aug. 8, 1994 [RU] Russian Federation ............. 94029714
Jul. 27, 1995 [WO] WIPO ..................... PCT/IB95/00623

[51] Int. Cl.$^6$ .................. C10G 19/02; C10G 29/00
[52] U.S. Cl. .................. 208/206; 208/207; 502/163
[58] Field of Search .................. 208/206, 207; 502/163

[56] References Cited

U.S. PATENT DOCUMENTS

| | | | |
|---|---|---|---|
| 2,882,224 | 4/1959 | Gleim et al. | 208/206 |
| 2,921,021 | 1/1960 | Urban et al. | 208/206 |
| 2,966,452 | 12/1960 | Gleim | 208/206 |
| 3,108,081 | 10/1963 | Gleim et al. | 208/206 |
| 3,352,777 | 11/1967 | Sparks | 208/206 |
| 3,371,031 | 2/1968 | Strong et al. | 208/207 |
| 3,566,959 | 3/1971 | Takase et al. | 260/608 |
| 4,003,827 | 1/1977 | Carlson et al. | 208/206 |
| 4,048,097 | 9/1977 | Douglas | 208/206 |
| 4,290,913 | 9/1981 | Frame | 502/163 |
| 4,318,825 | 3/1982 | Frame | 502/163 |
| 4,885,268 | 12/1989 | Dowd | 502/163 |

FOREIGN PATENT DOCUMENTS

| | | | |
|---|---|---|---|
| 2 588 265 | 10/1985 | France | C10G 27/10 |
| 2 588 266 | 10/1985 | France | C10G 27/10 |
| 1810377 | 4/1993 | Russian Federation . | |
| 1824421 | 6/1993 | Russian Federation . | |
| 910733 | 11/1981 | U.S.S.R. . | |
| 1535022 | 11/1987 | U.S.S.R. . | |
| 1497830 | 4/1989 | U.S.S.R. . | |
| 1567598 | 5/1990 | U.S.S.R. . | |
| 1579927 | 7/1990 | U.S.S.R. . | |
| 1616959 | 12/1990 | U.S.S.R. . | |

OTHER PUBLICATIONS

Mazilish et al., "Oxidation of Mercaptans By Oxygen in the Presence of Bromine–Substituted Derivatives of Cobalt Phthralocyanines", Zh. Prikl. Khim., 56 (9), 2093–7, 1983 (no month).

Gorbunov et al. "Substantiation of the Maximum Permissible Concentration of Cobalt Phthalocyanine Dichlorodihydroxysulfonic Acid in the Air of the Working Zone", Ref. Zh. Khim., 1987 (no month).

*Primary Examiner*—Walter D. Griffin
*Attorney, Agent, or Firm*—R. J. Sheridan

[57] ABSTRACT

Low molecular weight mercaptans are extracted from petroleum (e.g., crude oil) or gas condensate by contacting the mercaptans with oxygen in an aqueous solution of a metal hydroxide in the presence of a cobalt dihalodihydroxydisulfophthalocyanine catalyst. The catalyst is introduced into the crude oil or gas condensate continuously in the form of a catalytic complex in an aqueous solution of a metal hydroxide.

13 Claims, No Drawings

METHOD FOR THE EXTRACTION OF LOW MOLECULAR WEIGHT MERCAPTANS FROM PETROLEUM AND GAS CONDENSATES

BACKGROUND OF THE INVENTION

The present invention relates to petrochemistry, specifically to a method for the extraction of mercaptans from petroleum and gas condensates, and may find application in the petroleum, natural gas, petroleum-processing and petrochemical industry.

Known methods for the extraction of mercaptan from oil and gas condensates involve their treatment with an 18 to 25% aqueous solution of an alkali metal hydroxide, ethyl alcohol, ketone and formaldehyde, with the subsequent release of the purified product (see Russian Author's Certificates Nos. 1567598 and 1579927 issued in 1990).

Another known method for the extraction of mercaptan from gas condensates is by a process which involves treatment with a sodium salt of arylsulfinic acid with the subsequent release of the purified product (see Russian Author's Certificate No. 1810377 issued in 1993.)

The principal drawbacks of the known methods consist in the great amount of scarce and costly reagents which must be consumed in the process (namely, ketones, aldehydes, sulfinic acids), since during the extraction of the mercaptan from the raw material, the cited reagents which are applied enter into a permanent, irreversible reaction with the mercaptan, resulting in the formation of unregenerable organic compounds containing oxygen and sulfur.

A method is also known for the extraction of mercaptan from petroleum and petroleum byproducts by means of processing the raw material with a cuprate of the naphthene in the oil with the weight ratio of the copper salt to the mercaptan in the raw material falling within the range of from 3 to 4:1 (see Russian Author's Certificate No. 1616959 issued in 1990.)

The principal disadvantages of the aforesaid method are: the high rate of consumption of the scarce reagent involved, especially when purifying petroleum with a high content of sour sulfur (mercaptan sulfur), the difficulty of separating the resulting precipitate from the purified product, the formation of a waste byproduct (a precipitate) which is difficult to utilize, as well as the loss of the purified product together with the discarded residue.

The method which most closely resembles the method of the present invention both in its technological essence and the obtained result is a method for the extraction of mercaptans from petroleum distillates by processing with the oxygen of the air in an aqueous solution of an alkali metal hydroxide, in the presence of a cobalt octocarboxytetraphenylphthalocyanine catalyst, in an amount of 0.005 to 0.2 weight percent, as calculated with respect to the aqueous solution of the alkali metal hydroxide (see Russian Author's Certificate No. 1824421 issued in 1991). The principal disadvantages of this method are to be found in the insufficiently high degree of mercaptan extraction from the raw material as well as the low stability of the catalytic activity of the catalyst.

It is an object of the present invention to increase the degree to which the raw material is purified and the mercaptan extracted, to increase the stability of the catalytic activity of the catalyst under the conditions of the purification of petroleum and gas condensate.

SUMMARY OF THE INVENTION

In accordance with the present invention, there is provided a method of extraction of low molecular weight mercaptans from petroleum or gas condensate containing such low molecular weight mercaptans comprising (1) contacting the mercaptans with oxygen in an aqueous solution of a metal hydroxide, in the presence of a cobalt dihalodihydroxydisulfophthalocyanine catalyst, the catalyst being used in an amount within the range of from about $0.5 \times 10^{-5}$ to about $2.5 \times 10^{-5}$ weight percent based on the weight of the petroleum or gas condensate, the catalyst being introduced into the petroleum or gas condensate continuously in the form of a catalytic complex in an aqueous solution of a metal hydroxide, the extraction method being conducted at temperature ranging from about 40° to about 60° C. and a pressure ranging from about 1.0 to about 1.4 MPa, and (2) separating the petroleum or gas condensate from the aqueous solution of metal hydroxide.

Also provided in accordance with this invention is the above-described extraction method wherein the catalytic complex has been prepared by dissolving cobalt dihalodihydroxydisulfo-phthalocyanine in an aqueous solution of a metal hydroxide comprising about 1 weight percent metal hydroxide, based on the combined weight of the metal hydroxide and water, with the subsequent adjustment of the concentration of the metal hydroxide upwards to a level of about 2 to about 20 weight percent.

The present invention further provides cobalt dihalodihydroxy-disulfophthalocyanines having the general formula:

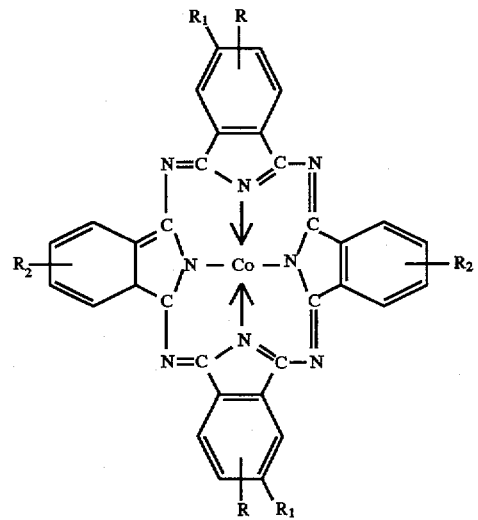

where R is —OH, $R_1$ is halogen and $R_2$ is —SO$_3$H.

The distinguishing features of the method of the present invention are to be found in the use of the cobalt dihalodihydroxydisulfophthalocyanine as the catalyst, the continuous introduction of the catalyst into the petroleum or gas condensate in the form of a catalytic complex in an aqueous solution of a metal hydroxide, the manner of preparation of the catalytic complex which is to be used, and the preferred conditions for the performance of the process.

The aforesaid distinguishing characteristics of the proposed method define its novelty and the level of the invention, as compared to the established state-of-the-art, since the application of the cobalt dihalodihydroxydisulfophthalocyanine, with its continuous introduction into the raw material in the form of a catalytic complex, in an aqueous solution of a metal hydroxide, for the purpose of treating petroleum and gas condensates has not been described in the literature, whereas it permits the process to be carried out with a higher degree of mercaptan oxidation, under conditions involving the prolonged use of the catalyst with a decrease in the rate of its consumption.

DETAILED DESCRIPTION OF PREFERRED EMBODIMENTS

The present invention provides a method of treating petroleum, e.g. whole crude oil, or gas condensates which contain low molecular weight mercaptans to convert the low molecular weight mercaptans to disulfides. As used herein, the term "low molecular weight mercaptans" refers to mercaptans in the $C_1$–$C_3$ range.

The method of this invention employs a cobalt dihalodihydroxydisulfophthalocyanine catalyst. This catalyst has the following general formula:

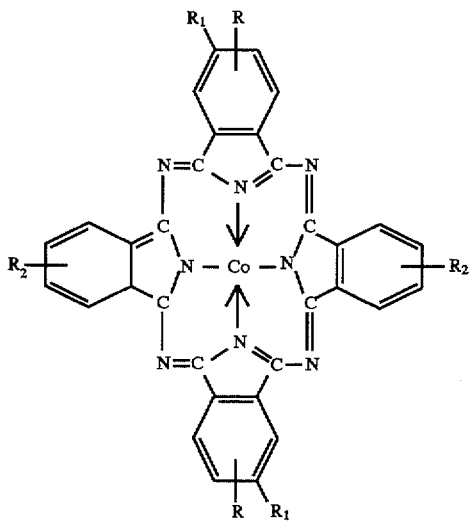

where R is —OH, $R_1$ is halogen (e.g., —Cl or —Br) and $R_2$ is —$SO_3H$. The position of the substituents on the phthalocyanine structure is not believed to be critical. Also, the formula above depicts the compound as having two each of —OH, halogen and —$SO_3H$ groups on the phthalocyanine structure. This represents the average number of these substituents in the molecule. In actual practice, any given molecule of the catalyst may contain 1–3 —OH groups, 2–4 halogens and 1–3 —$SO_3H$ groups. For economic reasons, the preferred halogen is chlorine, though bromine may also be used.

The proposed use of the cobalt dihalodihydroxydisulfophthalocyanine in an amount falling within the range of from about $0.5 \times 10^{-5}$ to about $2.5 \times 10^{-5}$ weight percent, based on the weight of the petroleum or gas condensate to be purified, is both necessary and sufficient. This is because if an amount less than $0.5 \times 10^{-5}$ weight percent is used, the necessary thoroughness of purification will not be achieved; on the other hand, if the amount used is greater than $2.5 \times 10^{-5}$ weight percent, such an increase does not bring about an improvement in the thoroughness of the extraction and becomes economically unjustifiable.

The use of a continuous flow of the catalyst in the form of a catalytic complex in an aqueous solution of a metal hydroxide, instead of a single step of loading the catalyst into the system, permits the stability of the catalytic effect of the metal hydroxide solution to be retained for a prolonged period of time, with a corresponding reduction in the rate of catalyst consumption.

The catalyst of this invention is dissolved in an aqueous solution of an metal hydroxide. Examples of suitable metal hydroxides include the alkali metal hydroxides and alkaline earth metal hydroxides. The preferred metal hydroxides are the alkali metal hydroxides, with sodium hydroxide being particularly preferred. The concentration of the metal hydroxide in the solution used to treat the petroleum or gas condensate should be from about 2 to about 20 weight percent, based on the weight of the metal hydroxide and water. However, it has been found that the cobalt dihalodihydroxydisulfophthalocyanine catalyst of this invention does not readily dissolve either in water or in a strongly alkaline aqueous solution. Therefore, it is preferred to dissolve the catalyst in a weakly alkaline aqueous solution, e.g., one containing about one weight percent metal hydroxide, and then raise the metal hydroxide concentration in the resulting catalyst-containing solution to the desired level of from about 2 to about 20 weight percent.

The proposed method has been successfully tested on a pilot installation with a capacity of 2 tons/hr, using crude oil and gas condensate from the Tengiz formation as a test sample. The method shall now be described with reference to the following examples.

EXAMPLE 1

The extraction of low molecular weight mercaptans from oil is carried out using a pilot installation, which consists of a cavity to be used for the preparation of the catalytic complex, a reaction column, a settling tank for the separation of the treated oil from the alkaline solution, and pump to be used to supply the solution to a mixer.

The initial crude oil, the air, and the catalytic complex together with the aqueous solution of an alkali metal hydroxide which is circulating through the system are continuously fed to the mixer, and from there to the reaction column. The obtained products are fed from the reaction column into the settling tank, taking off treated oil from the top of the column and the circulating alkaline solution from the bottom. The alkaline solution then returns to the mixer and is reused.

The continuous supply of the catalytic complex to the mixer is performed by means of a dosing pump, from the cavity which is to be used to prepare the catalytic complex.

The preparation of the catalytic complex of cobalt dihalodihydroxydisulfophthalocyanine in an aqueous solution of an alkali metal hydroxide is carried out according to the following procedure. 1.6 Grams of cobalt dichlorodihydroxydisulfophthalocyanine is dissolved in two liters of a 1 weight percent aqueous solution of an alkali metal hydroxide. Once the catalyst has been completely dissolved, the concentration of the alkali metal hydroxide is adjusted upwards to a level of 20 weight percent. The obtained catalyst solution is introduced into the reaction system at a rate of 0.2 liter/hr. During this time, the concentration of the catalyst constitutes $1 \times 10^{-5}$ weight percent, based on the weight of the crude oil.

The experimental conditions are:

rate of oil consumption; 2 $m^3$/hr, or 1600 tons/hr;

rate of circulation of the alkaline solution; 0.2 ton/hr;

rate of consumption of the alkaline solution of the catalyst: 0.2 l/hr;

concentration of the alkali: 20 weight percent;

air consumption: 1.2 $nm^3$/hr;

temperature of the process: 50° C.;

pressure of the process: 1.2 MPa;

quantity of the circulating alkaline solution of the catalyst in the system: 800 kg;

initial quantity of methylmercaptan and ethylmercaptan in the crude oil adds up to 400 ppm (0.04 weight percent).

According to the experimental process, every four hours samples of treated crude oil are taken and analyzed for methylmercaptan and ethylmercaptan content by chromatographic method, using a "Tsvet-500" chromatograph with a flame-photometric detector. The results of the experiment are presented in the Table below.

EXAMPLE 2

Under the same conditions as those described in Example 1, crude oil is subjected to purification with the continuous supply of the catalytic complex of cobalt dichlorodihydroxy-disulfophthalocyanine in an aqueous solution of an alkali metal hydroxide, prepared as in the case of Example 1, at a rate of 0.1 liter per hour. In this case, the concentration of catalyst is $0.5 \times 10^{-5}$ weight percent. Every four hours, a sample of treated oil is removed and analyzed for the presence of methylmercaptan and ethylmercaptan. The results of the experiment are given in the Table below.

EXAMPLE 3

Under the same conditions as those described in Example 1, crude oil is subjected to purification with the continuous supply of the catalytic complex of cobalt dichlorodihydroxy-disulfophthalocyanine in an aqueous solution of an alkali metal hydroxide, prepared as in the case of Example 1, at a rate of 0.5 liter per hour. In this case, the concentration of catalyst is $2.5 \times 10^{-5}$ weight percent. Every four hours, a sample of treated oil is removed and analyzed for the presence of methylmercaptan and ethylmercaptan. The results of the experiment are given in the Table below.

EXAMPLE 4

Under the same conditions as those described in Example 1, gas condensate is subjected to purification with the continuous supply of the catalytic complex of cobalt dichlorodihydroxy-disulfophthalocyanine in an aqueous solution of an alkali metal hydroxide, prepared as in the case of Example 1, at a rate of 0.1 liter per hour. In this case, the concentration of catalyst is $0.5 \times 10^{-5}$ weight percent. Every four hours, a sample of treated oil is removed and analyzed for the presence of methylmercaptan and ethylmercaptan. The results of the experiment are given in the Table below.

EXAMPLE 5

Under the same conditions as those described in Example 1, crude oil is subjected to purification with the continuous supply of the catalytic complex of cobalt dichlorodihydroxy-disulfophthalocyanine in an aqueous solution of an alkali metal hydroxide, prepared as in the case of Example 1, at a rate of 0.5 liter per hour. In this case, the concentration of catalyst is $2.5 \times 10^{-5}$ weight percent. For this experiment, the temperature of the process is maintained at 40° C. Every four hours, a sample of treated oil is removed and analyzed for the presence of methylmercaptan and ethylmercaptan. The results of the experiment are given in the Table below.

EXAMPLE 6

Under the same conditions as those described in Example 1, oil is subjected to purification with the continuous supply of the catalytic complex of cobalt dichlorodihydroxydisulfophthalocyanine in an aqueous solution of an alkali metal hydroxide, prepared as in the case of Example 1, at a rate of 0.5 liter per hour. In this case, the concentration of catalyst in terms of the oil is $2.5 \times 10^{-5}$ weight percent. For this experiment, the temperature of the process is maintained at 60° C. Every four hours, a sample of treated oil is removed and analyzed for the presence of methylmercaptan and ethylmercaptan. The results of the experiment are given in the Table below.

EXAMPLE 7

Under the same conditions as those described in Example 1, gas condensate is subjected to purification with the continuous supply of the catalytic complex of cobalt dichlorodihydroxydisulfophthalocyanine in an aqueous solution of an alkali metal hydroxide, prepared as in the case of Example 1, at a rate of 0.1 liter per hour. In this case, the concentration of catalyst is $0.5 \times 10^{-5}$ weight percent. For this experiment, the pressure of the system is maintained at 1.0 MPa. Every four hours, a sample of treated oil is removed and analyzed for the presence of methylmercaptan and ethylmercaptan. The results of the experiment are given in the Table below.

EXAMPLE 8

Under the same conditions as those described in Example 1, gas condensate is subjected to purification with the continuous supply of the catalytic complex of cobalt dichlorodihydroxydisulfophthalocyanine in an aqueous solution of an alkali metal hydroxide, prepared as in the case of Example 1, at a rate of 0.1 liter per hour. In this case, the concentration of catalyst is $0.5 \times 10^{-5}$ weight percent. For this experiment, the pressure of the system is maintained at 1.4 MPa. Every four hours, a sample of treated oil is removed and analyzed for the presence of methylmercaptan and ethylmercaptan. The results of the experiment are given in the Table below.

COMPARATIVE EXAMPLE A

Under the same conditions as those described in Example 1, oil is subjected to purification with a single-step of loading the reaction system with the catalytic complex of cobalt dichlorodihydroxydisulfophthalocyanine in an aqueous solution of an alkali metal hydroxide, prepared as in the case of Example 1, at a rate of 0.1 liter per hour. In this case, the concentration of catalyst comprises $2.5 \times 10^{-5}$ weight percent. Every four hours, a sample of treated oil is removed and analyzed for the presence of methylmercaptan and ethylmercaptan. The results of the experiment are given in the Table below.

COMPARATIVE EXAMPLE B

Under the same conditions as those described in Example 1, oil is subjected to purification with the continuous supply of the catalytic complex of octacarboxytetraphenylphthalocyanine in an aqueous solution of an alkali metal hydroxide, prepared as in the case of Example 1, at a rate of 0.5 liter per hour. In this case, the concentration of catalyst is $2.5 \times 10^{-5}$ weight percent. Every four hours, a sample of treated oil is removed and analyzed for the presence of methylmercaptan and ethylmercaptan. The results of the experiment are given in the Table below.

As can be seen from the Table below, the use of the catalyst of this invention (e.g., Example 3), as compared to the known catalyst (Comparative Example B), under conditions of their continuous introduction into the raw material supply allows the degree of extraction of low molecular weight mercaptans from the crude oil and gas condensate to be increased by 15 to 20%.

The continuous introduction into the reaction mixture of cobalt dichlorodihydroxydisulfophthalocyanine as a catalytic complex in an aqueous solution of an alkali metal hydroxide (Examples 1, 2, 3), as compared to its introduction by loading in a single operation loading (Comparative Example A), allows the degree of extraction of low molecular weight mercaptans from crude oil and gas condensate to be increased by 30%.

The cited advantages of the catalyst of this invention as well as of the method of its introduction into the reaction system, allow the necessary degree of extraction of low molecular weight mercaptans from crude oil and gas condensate to be attained, with the benefit of prolonged use of the catalyst, thereby significantly increasing the technological and economic indicators for the process as a whole.

TABLE

| Example # | Type of raw material | Process conditions Temperature, °C. | Pressure, MPa | Method of supplying the catalytic complex into the reaction mixture | Catalyst concentration in terms of raw material, weight percent | Initial content of methyl- & ethyl- mercaptans, ppm | Time of sampling, in hours | Content of methyl- & ethyl- mercaptan in the treated material, ppm | Degree of purification, % |
|---|---|---|---|---|---|---|---|---|---|
| 1 | Oil | 50 | 1.2 | continuous supply to mixer | $1 \times 10^{-5}$ | 400 | 0 | — | — |
|   |   |   |   |   |   |   | 4 | 9 | 97.75 |
|   |   |   |   |   |   |   | 8 | 6 | 98.50 |
|   |   |   |   |   |   |   | 12 | 9 | 97.75 |
|   |   |   |   |   |   |   | 16 | 8 | 98.00 |
|   |   |   |   |   |   |   | 20 | 7 | 98.25 |
|   |   |   |   |   |   |   | 24 | 7 | 98.25 |
| 2 | Oil | 50 | 1.2 | continuous supply to mixer | $0.5 \times 10^{-5}$ | 400 | 0 | — | — |
|   |   |   |   |   |   |   | 4 | 22 | 94.50 |
|   |   |   |   |   |   |   | 8 | 26 | 93.50 |
|   |   |   |   |   |   |   | 12 | 20 | 95.00 |
|   |   |   |   |   |   |   | 16 | 27 | 93.25 |
|   |   |   |   |   |   |   | 20 | 19 | 95.25 |
|   |   |   |   |   |   |   | 24 | 24 | 94.00 |
| 3 | Oil | 50 | 1.2 | continuous supply to mixer | $2.5 \times 10^{-5}$ | 400 | 0 | — | — |
|   |   |   |   |   |   |   | 4 | 1.8 | 99.55 |
|   |   |   |   |   |   |   | 8 | 1.2 | 99.70 |
|   |   |   |   |   |   |   | 12 | 1.7 | 99.57 |
|   |   |   |   |   |   |   | 16 | 1.4 | 99.65 |
|   |   |   |   |   |   |   | 20 | 1.2 | 99.70 |
|   |   |   |   |   |   |   | 24 | 1.6 | 99.60 |
| 4 | Gas condensate | 50 | 1.2 | continuous supply to mixer | $0.5 \times 10^{-5}$ | 160 | 0 | — | — |
|   |   |   |   |   |   |   | 4 | 10 | 93.75 |
|   |   |   |   |   |   |   | 8 | 19 | 94.37 |
|   |   |   |   |   |   |   | 12 | 12 | 92.50 |
|   |   |   |   |   |   |   | 16 | 8 | 95.00 |
|   |   |   |   |   |   |   | 20 | 9 | 95.00 |
|   |   |   |   |   |   |   | 24 | 11 | 93.12 |
| 5 | Oil | 40 | 1.2 | continuous supply to mixer | $2.5 \times 10^{-5}$ | 400 | 0 | — | — |
|   |   |   |   |   |   |   | 4 | 2.5 | 99.38 |
|   |   |   |   |   |   |   | 8 | 2.6 | 99.30 |
|   |   |   |   |   |   |   | 12 | 2.3 | 99.40 |
|   |   |   |   |   |   |   | 16 | 2.9 | 99.28 |
|   |   |   |   |   |   |   | 20 | 2.6 | 99.35 |
|   |   |   |   |   |   |   | 24 | 2.7 | 99.33 |
| 6 | Oil | 60 | 1.2 | continuous supply to mixer | $2.5 \times 10^{-5}$ | 400 | 0 | — | — |
|   |   |   |   |   |   |   | 4 | 1.0 | 99.73 |
|   |   |   |   |   |   |   | 8 | 1.1 | 99.73 |
|   |   |   |   |   |   |   | 12 | 0.8 | 99.80 |
|   |   |   |   |   |   |   | 16 | 0.9 | 99.78 |
|   |   |   |   |   |   |   | 20 | 1.0 | 99.75 |
|   |   |   |   |   |   |   | 24 | 1.0 | 99.75 |
| 7 | Gas condensate | 50 | 1.0 | continuous supply to mixer | $0.5 \times 10^{-5}$ | 160 | 0 | — | — |
|   |   |   |   |   |   |   | 4 | 16 | 90.00 |
|   |   |   |   |   |   |   | 8 | 18 | 88.75 |
|   |   |   |   |   |   |   | 12 | 17 | 89.38 |
|   |   |   |   |   |   |   | 16 | 14 | 91.25 |
|   |   |   |   |   |   |   | 20 | 16 | 90.00 |
|   |   |   |   |   |   |   | 24 | 17 | 89.38 |
| 8 | Gas condensate | 50 | 1.4 | continuous supply to mixer | $0.5 \times 10^{-5}$ | 160 | 0 | — | — |
|   |   |   |   |   |   |   | 4 | 5 | 96.88 |
|   |   |   |   |   |   |   | 8 | 7 | 95.63 |
|   |   |   |   |   |   |   | 12 | 4 | 97.50 |
|   |   |   |   |   |   |   | 16 | 6 | 96.25 |
|   |   |   |   |   |   |   | 20 | 5 | 96.88 |
|   |   |   |   |   |   |   | 24 | 3 | 98.13 |
| Comp. Ex. A | Oil | 50 | 1.2 | single loading into reaction column | $2.5 \times 10^{-5}$ | 400 | 0 | — | — |
|   |   |   |   |   |   |   | 4 | 25 | 93.75 |
|   |   |   |   |   |   |   | 8 | 56 | 86.00 |
|   |   |   |   |   |   |   | 12 | 61 | 84.75 |

TABLE-continued

| Example # | Type of raw material | Process conditions Temperature, °C. | Pressure, MPa | Method of supplying the catalytic complex into the reaction mixture | Catalyst concentration in terms of raw material, weight percent | Initial content of methyl- & ethyl- mercaptans, ppm | Time of sampling, in hours | Content of methyl- & ethyl- mercaptan in the treated material, ppm | Degree of purification, % |
|---|---|---|---|---|---|---|---|---|---|
|  |  |  |  |  |  |  | 16 | 70 | 82.50 |
|  |  |  |  |  |  |  | 20 | 94 | 76.50 |
|  |  |  |  |  |  |  | 24 | 110 | 72.50 |
| Comp. Ex. B | Oil | 50 | 1.2 | continuous supply of cobalt octecarboxy- tetraphenyl- phthalo- cyanine to mixer | $2.5 \times 10^{-5}$ | 400 | 0 | — | — |
|  |  |  |  |  |  |  | 4 | 59 | 85.25 |
|  |  |  |  |  |  |  | 8 | 70 | 82.50 |
|  |  |  |  |  |  |  | 12 | 68 | 83.00 |
|  |  |  |  |  |  |  | 16 | 60 | 85.00 |
|  |  |  |  |  |  |  | 20 | 71 | 82.25 |
|  |  |  |  |  |  |  | 24 | 66 | 83.50 |

EXAMPLE 9

Synthesis of cobalt dichlorodihydroxydisulfoph- thalocyanine Catalyst 2.19 Moles of carbamide ($CO(NH_2)_3$), 0.753 mole of monosodium salt of 4-chlorophthalic acid, 0.482 mole of cobalt chloride ($CoCl_2 4H_2O$), 0.0158 mole of ammonium molybdate ($MoO_4(NH_4)_2 4H_2O$), and 1.525 moles of ammonium chloride ($NH_4Cl$) are thoroughly mixed in a suitable vessel and then heated up to 220°–230° C. and maintained at constant mixing for 25–30 minutes. The resulting mixture is then ground in a ball mill.

1.31 Moles of oleum and 0.021 mole of boric acid are poured into the ground mixture at 113° C. and thoroughly mixed for 90 minutes. The resulting mixture is cooled to 20° C., and then nitrosyl sulfuric acid ($NaNO_2+H_2SO_4 H_2O=$ 0.033 mole+0.56 mole) is added to it. The mixture is maintained at constant mixing for 2 hours.

Water is then added to the obtained mass, which is maintained at 20°–25° C. for 1 hour. Sodium chloride solution is then poured into the obtained mass, and the mass is mixed for 5 minutes and settled for 4 hours.

After settlement, the upper aqueous layer is poured off, and the precipitate is filtered on a Nutch filter. The obtained paste is dried at 100° C. to a residual humidity of no more than 2%. The dried product is ground in a mill, producing the catalyst powder. It should be noted that this powder may contain impurities, but they do not appear to affect the performance of the catalyst.

What is claimed is:

1. A method of extraction of low molecular weight mercaptans from petroleum or gas condensate containing such low molecular weight mercaptans comprising (1) contacting the mercaptans with oxygen in an aqueous solution of a metal hydroxide, in the presence of a cobalt dihalodihydroxydisulfophthalocyanine catalyst, the catalyst being used in an amount within the range of from about $0.5 \times 10^{-5}$ to about $2.5 \times 10^{-5}$ weight percent based on the weight of the petroleum or gas condensate, the catalyst being introduced into the petroleum or gas condensate continuously in the form of a catalytic complex in an aqueous solution of a metal hydroxide, the extraction method being conducted at a temperature ranging from about 40° to about 60° C. and a pressure ranging from about 1.0 to about 1.4 MPa, and (2) separating the petroleum or gas condensate from the aqueous solution of metal hydroxide.

2. The method of claim 1 wherein the aqueous solution of a metal hydroxide comprises from about 2 to about 20 weight percent metal hydroxide, based on the combined weight of metal hydroxide and water.

3. The method of claim 2 wherein the aqueous solution comprises about 20 weight percent metal hydroxide.

4. The method of claim 1 wherein the metal hydroxide is selected from the group consisting of alkali metal hydroxides and alkaline earth metal hydroxides.

5. The method of claim 4 wherein the metal hydroxide is an alkali metal hydroxide.

6. The method of claim 5 wherein the alkali metal hydroxide is sodium hydroxide.

7. The method of claim 1, wherein the catalytic complex has been prepared by dissolving cobalt dihalodihydroxydisulfophthalocyanine in an aqueous solution of a metal hydroxide comprising about 1 weight percent metal hydroxide, based on the combined weight of the metal hydroxide and water, with the subsequent adjustment of the concentration of the metal hydroxide upwards to a level of about 2 to about 20 weight percent.

8. The method of claim 7 wherein the concentration of the metal hydroxide is adjusted upwards to a level of about 20 weight percent.

9. The method of claim 7 wherein the metal hydroxide is selected from the group consisting of alkali metal hydroxides and alkaline earth metal hydroxides.

10. The method of claim 9 wherein the metal hydroxide is an alkali metal hydroxide.

11. The method of claim 10 wherein the alkali metal hydroxide is sodium hydroxide.

12. The method of claim 1 wherein the petroleum is whole crude oil.

13. The method of claim 7 wherein the petroleum is whole crude oil.

* * * * *